Patented Dec. 29, 1953

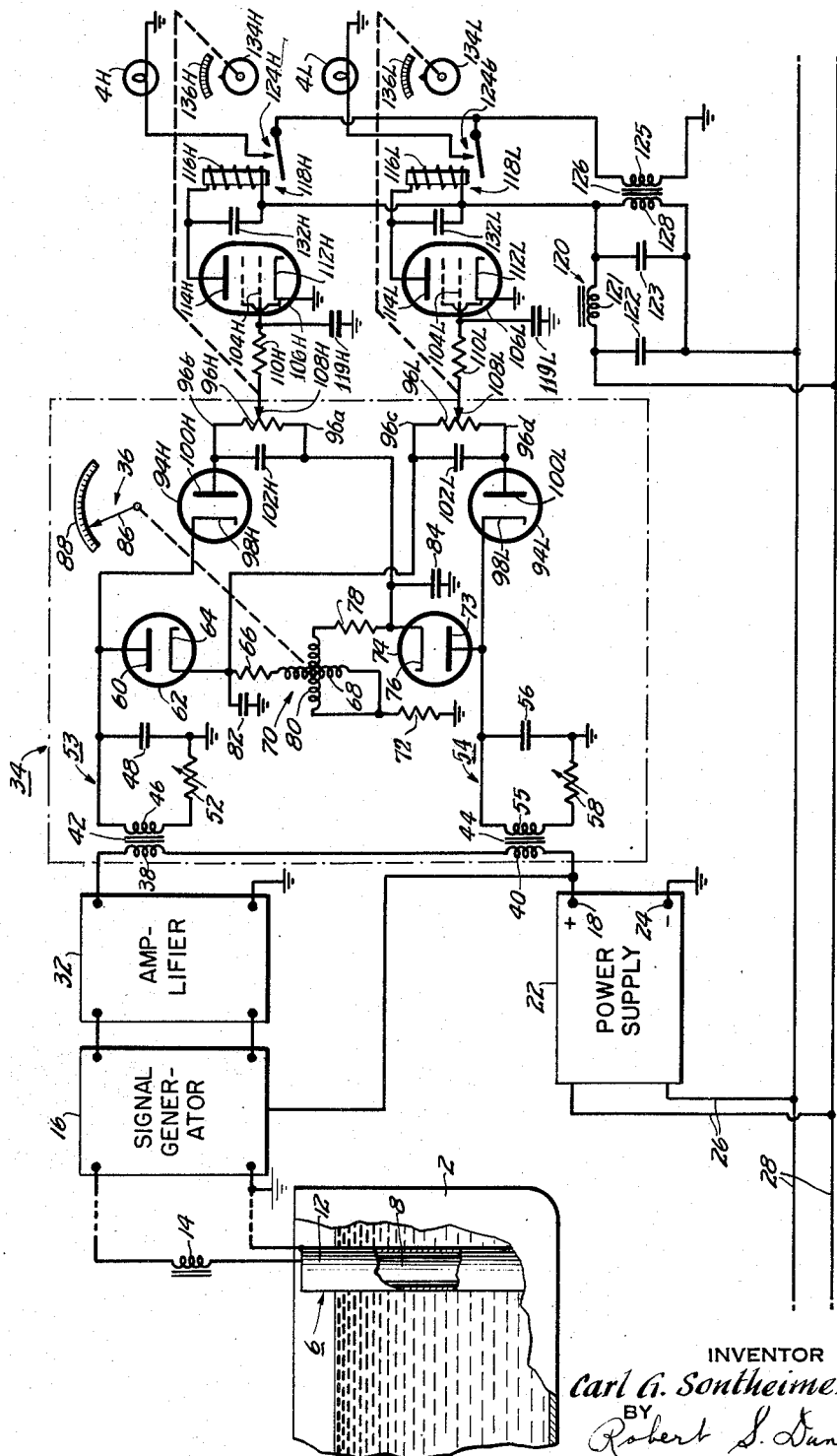

2,664,556

UNITED STATES PATENT OFFICE 2,664,556

FREQUENCY-SENSITIVE APPARATUS FOR INDICATING THE MAGNITUDE OF A CONDITION AND LIMIT INDICATION MEANS THEREFOR

Carl G. Sontheimer, Riverside, Conn., assignor to The Liquidometer Corporation, Long Island City, N. Y., a corporation of Delaware Application July 22, 1950, Serial No. 175,448

13 Claims. (Cl. 340—207)

This invention relates to a frequency sensitive apparatus, and more particularly to automatic indicating and control systems which will energize warning devices or other work units when the magnitude of a condition, which has been translated into the frequency of an alternating signal, exceeds or falls below predetermined values respectively. Means continuously responsive to the magnitude of such a condition are also provided for indicating such magnitude. The invention is herein described particularly as embodied in a warning indicator in conjunction with an aircraft fuel gauge for indicating the contents of one or more tanks and for providing warning signals when the fuel supply exceeds or falls below predetermined values.

In my earlier application Ser. No. 65,094, filed December 14, 1948, now Patent No. 2,621,517, I have illustrated and described apparatus continuously responsive to the magnitude of a condition, in which a series-resonant condition measuring circuit is connected to a variable frequency oscillator, which is so constructed and arranged as to generate an alternating signal at the resonant frequency of the measuring circuit. The oscillator may, for example, be connected to any frequency-sensitive circuit or means capable of operating an indicator or control system. One such frequency-sensitive circuit is described in that application. To the extent of this common subject matter, therefore, the present application is in effect a division of my application Ser. No. 65,094, in that claims directed specifically to a frequency-sensitive circuit are contained in the present case.

In my earlier application, Ser. No. 149,558, filed March 14, 1950, now Patent No. 2,621,518, I have described and illustrated apparatus continuously responsive to the magnitude of a condition in which a parallel-resonant condition measuring circuit is connected to a variable frequency oscillator, which is also so constructed and arranged as to generate an alternating signal at the resonant frequency of the measuring circuit. Again, the oscillator may, for example, be connected to any frequency-sensitive circuit or means capable of operating an indicator or control system.

In both of the above mentioned applications, of both of which this application is a continuation-in-part, the systems are illustrated and described as embodied in apparatus for measuring the level of liquid in aircraft fuel tanks. In both cases, the capacity of a measuring condenser mounted in the fuel tank varies with changes in fuel level; the condenser, in turn, controls the frequency of a signal generated in a variable frequency oscillator. The frequency of this signal is measured by a discriminator circuit, which produces direct currents, which may, for example, control a visual indicator for indicating the amount of fuel in the tank.

In addition to the continuous indication provided by the above described arrangements, it is advantageous to have one or more warning indicators to denote the existence of particular conditions. For example, in most commercial and military aircraft, the pilot must give more or less constant attention to a relatively large number of instruments; and such a warning indicator, set to warn the pilot when his fuel supply is nearly exhausted, that is, has decreased to some predetermined level, relieves the pilot from the necessity for making frequent checks of the continuous-reading fuel gauge. Moreover, such a warning indicator is useful when fuel is being taken aboard the aircraft, so that the pilot, or attendant, is warned when the fuel level has reached the desired level, thus, denoting that sufficient fuel has been taken aboard for the particular flight, and at the same time avoiding the likelihood of overflow of the fuel, with the accompanying fire hazard.

Such a warning system must be both accurate and reliable and, moreover, for aircraft use must be relatively light in weight, occupy only a small amount of space, and be sufficiently rugged to withstand the continual vibration to which it will be subjected in normal use. Because the supply voltages, particularly in aircraft, cannot be depended upon to remain constant, the operation of the warning indicator system must be substantially independent of changes in the supply voltages.

Considerable saving in complexity of the warning indicator system is possible, if the same variable-frequency signal that operates the continuous fuel indicator is utilized to control the warning indicator system. However, the usual signal generator, which produces this control signal, does not maintain a constant amplitude throughout its frequency range, and such amplitude changes must not interfere with the accuracy of the warning system.

In accordance with the present invention, a compact, light-weight and highly accurate and reliable limit-indicating system is provided which can be manually adjusted to indicate when any of one or more conditions is attained. One aspect of the present invention is directed to a variable frequency measuring system including an improved warning or control circuit. Another aspect is directed to such a system having two manually and independently adjustable limit indicators or controllers.

A further aspect of the invention is directed to a discontinuous indicating system which can be set to provide a response when a condition being measured exceeds a selectable value.

In accordance with the invention, the foregoing and other related objects and advantages are attained in a system which includes a warning or control circuit responsive to a unidirectional voltage of predetermined characteristics in combination with a frequency-sensitive signal conversion network adapted to convert variable frequency alternating voltages into unidirectional control voltages. This signal conversion network preferably includes signal rectifying elements and an adjustable resistance element connected in a bridge-like circuit in a manner to permit manual adjustment of the control point, the accuracy of the system being substantially independent of the magnitude of the variable frequency signal and of other variables normally encountered in commercial practice.

A more complete understanding of the invention can be had by reference to the following description of an illustrative embodiment thereof, when considered in connection with the accompanying drawing, the single figure of which is a diagrammatic illustration of a variable frequency telemetering system embodying the novel features of my invention.

In order to illustrate a specific application of the invention, there is shown in the drawing a variable frequency telemetering system arranged to provide a continuous indication of the amount of gasoline in a fuel tank 2 and which includes two warning indicators 4H and 4L for denoting when the fuel is above or below, respectively, two predetermined depths, although it will be understood that the invention is equally applicable to other variable-frequency measuring or control systems.

In the apparatus shown, a condenser, generally indicated at 6, having cylindrical plates 8 and 12 of metal or other conductive material, disposed one within the other in spaced, coaxial relationship, is utilized as a condition-responsive frequency-control element. The condenser plates 8 and 12 are mounted vertically in the fuel tank 2, the inner plate 8 being insulated from the tank 2, and the outer plate 12 preferably being connected to the tank 2 as a convenient ground return circuit.

The condenser 6 is connected in series with an inductor 14 and controls the operating frequency of a signal generator, indicated in block form at 16. For details of the construction of the signal generator, reference may be had to my two co-pending applications, Ser. Nos. 65,094 and 149,558. For the purposes of the present disclosure, however, it is sufficient to state that frequency produced by the generator 16 corresponds at any given time to the series-resonant frequency of the circuit formed by condenser 6 and the inductor 14, which, in turn, is a function of the amount of fuel in the tank 2. Positive voltage for the signal generator 16 is provided from a terminal 18 of a conventional rectifier-filter power supply, indicated in block form at 22, the negative power connection being made from a terminal 24 through a common ground circuit. The power supply 22 is energized by means of leads 26 which are connected to suitable alternating current supply mains 28.

The signal from generator 16 is amplified by a conventional type amplifier, indicated in block form at 32, and applied to a frequency-sensitive signal conversion nework, generally indicated at 34, which converts the signal from the generator 16 into voltages, having relative amplitudes dependent upon the frequency of the applied signal, that control the operation of a continuous indicator, generally indicated at 36, which denotes the amount of fuel in the tank 2.

The signal from the amplifier 32 is coupled to the conversion network 34 through two series-connected primary windings 38 and 40 of discriminator transformers 42 and 44 respectively, the positive power supply terminal 18 being connected to the amplifier 32 through these windings.

The secondary winding 46 of transformer 42 is connected in shunt with a series combination of a condenser 48 and an adjustable resistor 52 to form a resonant or selective circuit, generally indicated at 53, which is designed to be resonant near the highest operating frequency of the signal generator 16 and which produces an alternating voltage, the magnitude of which is a function of the frequency of the signal.

A second resonant or selective circuit, generally indicated at 54, is formed by the secondary winding 55 of the transformer 44 connected in shunt with the series combination of a condenser 56 and an adjustable resistor 58. The resonant frequency of the latter circuit is near the lower end of the frequency range of the signal generator 16. Like the circuit 53, the circuit 54 produces an alternating voltage, but the magnitude of which is a different function of the frequency of the signal.

One terminal of the condenser 48, in the higher frequency selective circuit 53, is connected to the common ground circuit, and its other terminal is connected to the anode 60 of a diode rectifier tube 62, the cathode 64 of which is connected through a series resistor 66 to one end of a deflecting coil 68 of a ratiometer, generally indicated at 70, which may operate the indicator 36, for example. The oppositie end of coil 68 is connected to ground through a bias resistor 72.

One terminal of the condenser 56, of the lower frequency selective circuit 54, is connected to the common ground and its other terminal is connected to the anode 73 of a diode rectifier tube 74, the cathode 76 of which is connected through a series resistor 78 to one end of a second deflecting coil 80 of the ratiometer 70. The opposite end of coil 80 is connected to ground through the common bias resistor 72. Two condensers 82 and 84 are connected between cathodes 64 and 76 respectively, and ground, to filter alternating components from the rectified signals. The ratiometer 70 may be of any conventional design. The deflecting coils 68 and 80 may be positioned at right angles or other substantial angle to each other and electrically arranged to control the position of a pointer 86, which is arranged to cooperate with a suitably calibrated scale 88 of the indicator 36.

The pointer 86 may, for example, be arranged to indicate at mid-scale when the currents through coils 68 and 80 are equal, and to move in one direction when the current through coil 68 is greater than that through coil 80, and to move in the opposite direction when the relative magnitudes of these currents are reversed. The magnitudes of these direct currents through these coils depend upon the alternating voltages developed across the condensers 48 and 56; and it is the ratio of these voltages that determines the reading on the scale 88. This ratio depends, in turn, upon the particular frequency being produced by the signal generator 16 and, accordingly, is an indication of the depth of the fuel in the tank 2.

The resistor 52 can be adjusted to control the Q of the resonant circuit 53, so that the pointer 86 indicates correctly when the fuel tank is empty, and the resistor 58 can be independently adjusted to set the Q of its resonant circuit 54, so that the pointer 86 indicates correctly on the scale 88 when the fuel tank 2 is full.

Summarizing the operation of the arrangement thus far described, it will be noted that the circuit 53 is resonant near the high frequency end of the range of the frequencies of the alternating signal supplied to the transformer primaries 38 and 40, while the circuit 54 is resonant near the lower end of this range. Preferably the resonant points are chosen slightly outside the range in each instance, so that as the frequency changes from one end of the range to the other, the voltage produced by one of the circuits 53 and 54 will increase as the magnitude of the condition being measured increases, i. e., a rise in the level of the liquid in the tank 2; while the voltage produced by the other of the circuits will decrease as the magnitude of the condition being measured increases.

Furthermore, due to the increase in voltage aforesaid, the currents flowing through the circuits 53 and 54 and therethrough to ground through the deflecting coils 68 and 80 of the ratiometer vary progressively from one extreme limit of the magnitude of the condition being measured to the other. Thus, starting with the tank 2 empty, the current flow through one of the deflecting coils 68 or 80 will be a maximum and that through the other a minimum. These current flows through the deflecting coils progressively change as the magnitude of the condition being measured changes from one limit to the other, so as to get a reverse distribution of current through the deflecting coils 68 and 80 at the other limit, i. e., with the tank 2 full in the embodiment illustrated.

It is further noted that each of these circuits have each two terminals, one of which in each case is connected to the anode of the diode rectifiers 62 and 74 respectively, while the other terminal of each circuit is connected to ground and hence through ground to one another. From one point of view, therefore, ground may be said to be a reference point as to potential or a common circuit connecting the circuits 53 and 54.

The arrangement of parts and construction of apparatus so far described may be similar to that described in my earlier applications, particularly Ser. No. 65,094, referred to above.

In order to warn the pilot, or other operating personnel, when the fuel in tank 2 has decreased to a predetermined level, a "low" warning indicator is provided, as in the form of an electric lamp 4L, which obviously can be replaced or supplemented by a buzzer or other suitable warning device. To provide a warning when the tank is being filled that the fuel has reached a predetermined depth, a second "high" warning indicator lamp 4H or other suitable alarm means is included in the circuit.

To provide a control potential for governing the action of the "high" indicator lamp 4H, a first bridge-type circuit, including a diode rectifier tube 94H and a potentiometer 96H connected in series therewith, is connected between the ungrounded side of the higher frequency resonant circuit 53 and the cathode 76 of the diode tube 74, the anode 73 of which is connected to the ungrounded terminal of the low frequency resonant circuit 54.

Thus, the high frequency resonant circuit is connected to the cathode 98H of the diode 94H, and its anode 100H is connected to one end of the potentiometer 96H, of high resistance, for example 10 megohms, the opposite end of which is connected through the diode 74 to the low frequency resonant circuit 54. A filter condenser 102H is connected in parallel with the potentiometer 96H. Because of the high resistance of the potentiometer 96H, only a slight current will flow through the bridge circuit, but the condenser 102H will be charged to a potential depending upon the difference in the voltages applied to it through the diodes 74 and 94H, respectively.

The voltage developed in the low frequency resonant circuit 54 is rectified by the diode tube 74, which conducts current only when the anode 73 is positive with respect to the cathode 76, so that the cathode 76 assumes a potential, positive with respect to ground, which is somewhat less than the peak voltage developed by the resonant circuit 54. The adjacent end 96a of potentiometer 96H, which is connected to cathode 76, is maintained, of course, at the same potential.

Similarly, the alternating voltage developed by the high frequency resonant circuit 53 is rectified by the diode tube 94H, which conducts current only when its cathode 98H is negative with respect to its anode 100H, and because of the high resistance of potentiometer 96H, the anode 100H of this tube, and accordingly the adjacent end 96b of potentiometer 96H, assumes a negative potential, with respect to ground, substantially equal to the peak voltage developed by the high frequency resonant circuit 53. Thus end 96b of the potentiometer 96H is at a negative voltage with respect to ground, and the other end 96a is at a positive voltage with respect to ground and, accordingly, there is one point along the potentiometer 96H that is at ground potential.

When the tank 2 is nearly full, the signal generator 16 is producing a frequency near the lower end of its range, so that the lower frequency resonant circuit 54 is developing a relatively large voltage, and the higher frequency resonant circuit 53 is devolping a much lower voltage. Thus, the end 96a of the potentiometer 96H, which is connected to the cathode 76 of the diode tube 74, is at a relatively high positive voltage, with respect to ground, whereas the opposite end 96b of this potentiometer is at a much lower voltage, negative with respect to ground, and the point on potentiometer 96H which is at ground potential will be near its negative end 96b. This ground-potential point gradually advances along the potentiometer 96H, toward end 96a, as the amount of gasoline in the tank is decreased and signal generator 16 produces a correspondingly higher frequency. It is to be noted that the position of this point, which is at ground potential, depends upon the ratio of the voltages applied to each end of the potentiometer 96H, and that it is substantially independent of the magnitude of the signal delivered by the signal generator 16. Thus, by utilizing the position of this ground-potential point on potentiometer 96H to control the warning indication circuit, errors caused by changes in supply voltage are eliminated; and it is unnecessary to provide a signal generator 16 capable of delivering a signal of constant magnitude throughout its frequency range.

The circuit for controlling the warning indicator is a voltage responsive circuit, shown in the drawing as a trigger circuit, the trigger controlling the "high" warning indicator lamp 4H being a gas-filled tetrode tube 106H. The control grid or starting electrode 104H of the tube 106H is connected to receive a control voltage from the adjustable contact 108H of the potentiometer 96H through a grid current limiting resistor 110H. The control grid 104H is also connected to ground through a condenser 119H. The cathode 112H of this tube is connected to ground, and its anode 114H is connected through the operating winding 116H of a relay, generally indicated at 118H, and a filter network, generally indicated at 120, to the voltage supply mains 28. The filter network 120, which includes a series inductor 121 and two shunt condensers 122 and 123, is provided to prevent high frequency noise generated by the gaseous discharge tubes from being coupled into the power supply mains 28.

The relay 118H is arranged to open and close switch contacts, generally indicated at 124H, which are connected in a circuit between the indicator lamp 4H and the secondary winding 125 of a transformer 126, the primary winding 128 of which is connected through the filter network 120 to the supply mains 28, so that the lamp 4H is energized whenever winding 116H of relay 118H is energized to close the switch contacts 124H.

In accordance with the usual operating characteristics of the gaseous discharge tube contemplated for use, this tube 106H will remain non-conductive so long as the control voltage, applied to the control grid 104H from the potentiometer contact 108H, is negative with respect to the potential of the cathode 112H which is grounded as aforesaid. However, when the control grid 104H reaches substantially the same potential as, or is positive with respect to, the cathode, which, in this example, is at ground potential, the tube 106H will conduct current whenever the anode 114H is positive, that is, during alternate half cycles of the supply voltage from mains 28. If the characteristics of the particular gas tube chosen for use are not such that it will ignite when the control grid is sufficiently near zero for the particular application, suitable bias circuits can be provided to give the desired characteristics, as is well known to those skilled in the art.

Thus, for example, assume the fuel tank 2 to be substantially empty and the potentiometer contact 108H positioned at approximately the mid-point of potentiometer 96H. The signal generator 16 will be operating near the highest frequency of its range, so that the ground-potential point on potentiometer 96H will be near the end 96a and the control grid 106H will be at a negative potential with respect to ground, thus preventing conduction of plate current in the tube 106H. Now assume that gasoline is being added to the tank 2, causing the frequency produced by signal generator 16 to decrease and the ground-potential point on potentiometer 96H to move towards end 96b, thus changing the voltage at potentiometer contact 108H in a positive direction. When the gasoline reaches a certain level, the negative control voltage on grid 108H will have been reduced to zero, or nearly to zero, causing the gas tube 104H to become conductive. A pulse of current will then flow through the relay winding 116H during each positive half cycle of alternating voltage at anode 114H, thus closing the switch contacts 124H. During negative half cycles of anode volage, tube 106H will not conduct current. Therefore a condenser 132H is connected across the winding 116H of relay 118H, so that the condenser will be charged during the periods of current conduction. During the half-cycles when tube 106H is not conducting, the condenser 132H will discharge through the winding 116H to maintain a substantially continuous flow of current, and to prevent chattering of the contacts 124H. Thus, the relay contacts 124H will remain closed, completing the circuit from the transformer secondary winding 125 to the warning indicator lamp 4H, which will remain illuminated as long as the tube 106H is firing, which is as long as the gasoline in the tank 2 is above the critical level. The level at which the lamp 4H becomes energized can be manually adjusted by moving the contact 108H along the potentiometer 96H. To permit convenient adjustment, the contact 108H is connected mechanically to a control knob 134H, which is provided with an index pointer arranged to cooperate with a scale 136H, calibrated in convenient units, so that the warning circuit can be adjusted readily to warn when the tank has been filled to any desired and manually adjustable level.

In order to provide a warning that the fuel has dropped to a predetermined low level in the tank, a second warning circuit is provided which is similar to the one described above, except that its indicator lamp 4L is energized whenever and as long as the fuel is below the level for which the control circuit is adjusted.

To this end, a second bridge type circuit is provided which includes a diode rectifier 94L and a potentiometer 96L connected in series between the low frequency resonant circuit 54 and the cathode 64 of the diode tube 62, the anode 60 of which is connected to the high frequency resonant circuit 53. A filter condenser 102L is connected in parallel with the potentiometer 96L. In this circuit, the end 96c of potentiometer 96L is maintained at a positive potential with respect to ground, and end 96d is negative with respect to ground, for the same reasons as are set forth in connection with the first warning circuit described above. With this arrangement, the ground-potential point moves from a position near end 96c of potentiometer 96L, when the tank is full, toward end 96d of the potentiometer, as the tank is emptied. At some fuel level during the emptying of tank 16, depending upon the setting of potentiometer contact 108L, the negative voltage on the control grid 104L of a second gas-filled tetrode tube 106L will reach ground potential, thus igniting the tube 106L and causing current to flow through the operating winding 116L of a relay 118L. The control grid 104L is connected to ground through a condenser 119L. The gaseous discharge tube 106L, and its associated circuits including the indicator lamp 4L and a control knob 134L, are identical with the similarly numbered parts of the circuits previously described, so that it is unnecessary to describe the operation of these circuits more fully.

As an example of a circuit in accordance with the present invention, the circuit shown in the drawing was arranged as follows, with desired results. Diode rectifier tubes 62, 74, 94H and 94L are each type 6AL5. Gaseous discharge tubes 106H and 106L are each type 2D21. Potentiometers 96H and 96L each have a value of 10 megohms, and filter condensers 102H and 102L each have a value of 470 micromicrofarads. Grid current limiting resistors 118H and 118L each have a value of 2.2 megohms, and the condensers 119H and 119L each has a value of 470 micromicrofarads. Operating windings 116H and 116L each have a rating of 3500 ohms and 7 milliamperes, and condensers 132H and 132L each have a value of 0.25 microfarad. The voltage supply mains 28 furnish 110 volts at 400 cycles across shunt condenser 122, which has a value of 0.1 microfarad. Shunt condenser 123 has a value of 0.01 microfarad. Series inductor 120 has a value of 8 millihenrys. 6.3 volts are supplied to the heater filaments (not shown) of the gaseous discharge tubes 106H and 106L from the transformer secondary 125.

From the foregoing it will be apparent that the warning system embodying the invention is well adapted to attain the ends and objects hereinbefore set forth and to be economically manufactured, since the separate features are well suited to common production methods and are subject to a variety of modifications as may be desirable in adapting the invention to different uses and applications.

Although the foregoing discussion is limited to a consideration of "indicators," it should be noted that the term is used only for the sake of simplicity and concreteness, as it is obvious that similar considerations also apply to work units of the type which will perform some desired operation automatically when the fuel level rises or falls to a preselected level without necessarily notifying an observer. For example, such a work unit might comprise a valve to switch a fuel outlet line from one tank to another when the first tank is nearly empty. Consequently, the expression "work unit" is used herein and in the appended claims to include any device adapted to be operted in the manner described herein. Moreover, it is apparent that the invention, while having particular application and utility in fuel measuring systems, can be applied to other warning or control arrangements wherein it is desired to control a work unit in accordance with variations in an applied frequency. Thus, it is to be understood that for particular applications, advantageous use may be made of certain features of the invention without a corresponding use of other features.

Since these and similar modifications and changes could be made without departing from the scope or spirit of the invenititon, the apparatus described is to be construed as illustrative, and not in a limiting sense.

What is claimed is:

1. In a system responsive to a predetermined magnitude of a variable condition, wherein an electrical signal is generated, the frequency of which is a function of the magnitude of the condition, apparatus including a signal generator, the frequency of which is a function of the magnitude of said condition, a first frequency selective circuit coupled to said generator and producing a first alternating voltage, the magnitude of which is a function of the frequency of said generator, a second frequency selective circuit coupled to said generator and producing a second alternating voltage, the magnitude of which is a different function of the frequency of said generator, first rectifier means coupled to said first frequency selective circuit arranged to produce a first unidirectional voltage, the magnitude of which is a function of the magnitude of said first alternating voltage, second rectifier means coupled to said second frequency selective circuit arranged to produce a second unidirectional voltage the magnitude of which is a function of said second alternating voltage, high impedance resistive means connected in series between said first and second rectifier means, said first and second rectifier means being connected to pass unidirectional electric energy in a single direction through said resistive means, condenser means connected in parallel with said resistive means for storing the pulsating voltages from said rectifier means to produce a smooth direct potential across said resistive means, on-off control means connected to said resistive means, and a work unit responsive to said on-off control means.

2. In a system responsive to the magnitude of a variable condition, wherein an alternating electrical signal is generated by a signal generator, and wherein the frequency of this signal is a function of the magnitude of the condition, apparatus for energizing a work unit in response to the magnitude of said condition attaining a predetermined limiting value, comprising two electrical circuit means coupled to said signal generator for translating said alternating electrical signal into respectively different electric alternating potentials at respective output terminals, the value of each of said potentials being a function of the frequency of said signal and of the magnitude of said condition, a series circuit connected between said terminals, including a first rectifier, a potentiometer resistance and a second rectifier, wherein, said first and second rectifiers are connected in said series circuit so as to pass unidirectional electric energy in a single direction through said potentiometer resistance, so that, upon a change of the frequency of said alternating signal with a change in the magnitude of said condition, a point along said potentiometer resistance at which the potential is a predetermined fixed value moves along said potentiometer resistance, and means including a tap on said potentiometer resistance and a trigger circuit responsive to at least a predetermined potential existing at said tap for energizing said work unit.

3. Apparatus according to claim 2, comprising in addition, means for manually adjusting the position of said tap along said potentiometer resistance, so as variably to predetermine the magnitude of said condition which will be effective to initiate the operation of said work unit.

4. Apparatus according to claim 2, wherein said potentiometer resistance is connected as aforesaid to said two electrical circuit means in such manner that as the magnitude of said condition increases, the potential at said tap increases, whereby the operation of said work unit is initiated when said magnitude attains a predetermined high value.

5. Apparatus according to claim 2, wherein said potentiometer resistance is connected as aforesaid to said two electrical circuit means in such manner that as the magnitude of said condition decreases, the potential at said tap increases, whereby the operation of said work unit is initiated when said magnitude falls to a predetermined low value.

6. In a system responsive to the magnitude of a variable condition, wherein an alternating electrical signal is generated by a signal generator, and wherein the frequency of this signal is a function of the magnitude of the condition, apparatus for energizing work units in response to the magnitude of said condition attaining predetermined limiting high and low values respectively, comprising two electrical circuit means coupled to said signal generator for translating said alternating electrical signal into respectively different electric alternating potentials at respective output terminals, the value of each of said potentials being a function of the frequency of said signal and of the magnitude of said condition; a first series circuit connected between said terminals, including a first rectifier, a first potentiometer resistance and a second rectifier, wherein said first and said second rectifiers are connected in said series circuit so as to pass unidirectional electric energy in a single direction through said first potentiometer resistance, so that, upon a change of the frequency of said alternating signal with a change in the magnitude of said condition, a point along said first potentiometer resistance at which the potential is raised to a predetermined fixed value moves along said first potentiometer resistance, and means including a tap on said first potentiometer resistance and a first trigger circuit responsive to at least a predetermined potential existing at said tap for energizing a first work unit; a second series circuit connected between said terminals, including a third rectifier, a second potentiometer resistance, and a fourth rectifier, wherein said third and fourth rectifiers are connected in said second series circuit so as to pass unidirectional electric energy in a single direction through said second potentiometer resistance, so that, upon a change of the frequency of said alternating signal with a change in the magnitude of said condition, a point along said second potentiometer resistance at which the potential is raised to a predetermined fixed value moves along said second potentiometer resistance, and means including a tap on said second potentiometer resistance and a second trigger circuit responsive to at least a predetermined potential existing at the second named tap for energizing a second work unit.

7. Apparatus for energizing a work unit in response to the frequency of an alternating signal from a signal generator attaining a predetermined value, comprising first and second resonant circuits having substantially different resonant frequencies, means coupling said signal generator to each of said resonant circuits, first and second rectifiers having positive and negative terminals, means electrically connecting said first resonant circuit to the positive terminal of said first rectifier, means electrically connecting said second resonant circuit to the positive terminal of said second rectifier, means including a resistor for electrically connecting the negative terminals of said first and second rectifiers to ground, so that said negative terminals are maintained at potentials positive with respect to ground, a bridge type circuit including a third rectifier having positive and negative terminals, means electrically connecting the positive terminal of said first rectifier to one terminal of said third rectifier, means including a potentiometer resistor electrically connecting the other terminal of said third rectifier in series to the negative terminal of said second rectifier, said bridge-type circuit being so constructed and arranged that one terminal of said potentiometer resistor is maintained at a potential positive with respect to ground and the other terminal of said potentiometer resistor is maintained at a potential negative with respect to ground, whereby there is a variable point on said potentiometer resistor which is at ground potential, the position of said variable point being responsive to the frequency of said alternating signal, and a control circuit for controlling said work unit and including means electrically connecting said control circuit to a predetermined fixed point along said potentiometer resistor, and means for energizing said work unit when a predetermined potential relationship exists between said variable point and said fixed point.

8. Apparatus in accordance with claim 7, wherein each of said rectifiers is a diode having a cathode as its negative terminal and an anode as its positive terminal, wherein the cathode of said third rectifier is connected to the anode of said first rectifier, wherein said potentiometer resistor is connected between the anode of said third rectifier and the cathode of said second rectifier, and wherein said control circuit comprises a trigger circuit having therein a gas-filled tube including a cathode, an anode and a starting electrode, a connection from a tap on said potentiometer resistor to said starting electrode so that said gas-filled tube will fire when the starting electrode thereof is brought up to a predetermined potential in respect to the potential of the cathode, and said control circuit also comprises a plate relay for controlling the operation of the work unit.

9. Apparatus for selectively energizing each of two work units in response to the frequency of an alternating signal from a signal generator attaining a predetermined high value and falling to a predetermined low value respectively, comprising first and second resonant circuits having substantially different resonant frequencies, means coupling said signal generator to each of said resonant circuits, first and second rectifiers having positive and negative terminals, means electrically connecting said first resonant circuit to the positive terminal of said first rectifier, means electrically connecting said second resonant circuit to the positive terminal of said second rectifier, means including a resistor for electrically connecting the negative terminals of said first and second rectifiers to ground, so that said negative terminals are maintained at potentials positive with respect to ground; two similar bridge-type circuits including third and fourth rectifiers respectively, each having positive and negative terminals, means respectively electrically connecting the positive terminals of said first and second rectifiers to a similar terminal of said third and fourth rectifiers, means including a first potentiometer resistor electrically connecting the other terminal of said third rectifier in series to the negative terminal of said second rectifier, means including a second potentiometer resistor electrically connecting the other terminal of said fourth rectifier in series to the negative terminal of said first rectifier, said bridge-type circuits being so constructed and arranged that one terminal of each of said potentiometer resistors is maintained at a potential positive with respect to ground and the other terminal of each of said potentiometer resistors is maintained at a potential negative with respect to ground, whereby there is a variable point on each of said potentiometer resistors which is at ground potential, the positions of said variable points being responsive to the frequency of said alternating signal; and first and second control circuits for controlling said work units respectively, and each including means electrically connecting one of said control circuits to a predetermined fixed point along one of said potentiometer resistors respectively, and means for energizing one of said work units respectively when a predetermined relationship exists between said variable point and said fixed point of the respectively connected potentiometer resistor.

10. Apparatus for energizing first and second work units in response to the frequency of an alternating signal from a signal generator attaining a predetermined high value and falling to a predetermined low value respectively, comprising two transformers each having a primary winding and a secondary winding, means electrically connecting said primary windings in series to said signal generator, first and second resonant circuits having resonant frequencies adjacent to the upper and lower ends respectively of a predetermined range; each of said resonant circuits including the secondary winding of one of said two transformers, a variable resistor connected between one end of each said secondary winding and ground, and a condenser connected between the other end of each said secondary winding and ground; first and second diode rectifiers each having a cathode and an anode; means electrically connecting the anodes of said rectifiers to the respective terminals of said condensers of said resonant circuits remote from ground, condensers respectively electrically connected between the cathodes of said rectifiers and ground, a common resistor electrically connected between the cathodes of said rectifiers and ground, so that said cathodes are maintained at potentials positive with respect to ground; a first bridge-type circuit including a third diode rectifier having a cathode and an anode, means electrically connecting the anode of said first rectifier to the cathode of said third rectifier, a first potentiometer resistor connected in series between the anode of said third rectifier and the cathode of said second rectifier, and a condenser connected across said first potentiometer resistor; a second bridge-type circuit including a fourth diode rectifier having a cathode and an anode, means electrically connecting the anode of said second rectifier to the cathode of said fourth rectifier, a second potentiometer resistor connected in series between the anode of said fourth rectifier and the cathode of said first rectifier, and a condenser connected across said second potentiometer resistor; so that the terminals of said first and second potentiometer resistors remote from said second and third rectifiers respectively are maintained positive with respect to ground, said apparatus being so constructed and arranged that the terminals of said first and second potentiometer resistors adjacent to said third and fourth rectifiers respectively are maintained at potentials negative with respect to ground, whereby there are variable points on said first and second potentiometer resistors respectively which are at ground potential, the positions of said variable points being respective functions of the frequency of said alternating signal; and first and second control circuits for controlling said first and second work units respectively, each of said control circuits including means electrically connecting said control circuit to a tap on said potentiometer resistors respectively, and a trigger circuit so arranged that the operation of said first work unit will be initiated when a predetermined relationship exists between said variable point and said tap on said first potentiometer resistor and the operation of said second work unit will be initiated when a predetermined relationship exists between said variable point and said tap on said second potentiometer resistor.

11. Apparatus for continuously measuring the frequency of an alternating signal having a frequency within a predetermined range and generated by a signal generator, and for initiating the operation of a work unit at a predetermined value of the frequency of said alternating signal, comprising first and second resonant circuits having substantially different resonant frequencies, means coupling said signal generator to each of said resonant circuits, first and second rectifiers each having a positive and a negative terminal, means respectively electrically connecting said resonant circuits to said rectifiers, means respectively electrically connecting the negative terminal of said rectifiers through a common resistor to ground, so that the negative terminals of said rectifiers are maintained at potentials positive with respect to ground; a bridge-type circuit including a third rectifier having two terminals, means electrically connecting the positive terminal of said first rectifier to one terminal of said third rectifier, and means including a series connected potentiometer resistor electrically connecting the other terminal of said third rectifier to the negative terminal of said second rectifier; said bridge-type circuit being so constructed and arranged that the end of said potentiometer resistor remote from said third rectifier is maintained at a potential positive with respect to ground and the other end of said potentiometer resistor is maintained at a potential negative with respect to ground, whereby there is a variable point on said potentiometer resistor which is at ground potential, the position of said variable point being a function of the frequency of said alternating signal; and a control circuit for controlling said work unit and including a gas-filled trigger tube having a cathode, a starting electrode and an anode, means electrically connecting a tap on said potentiometer resistor to said starting electrode, a plate relay connected to the anode of said tube to be energized when said tube fires, and a circuit controlled by said plate relay for controlling the operation of said work unit.

12. In a system responsive to a predetermined magnitude of a variable condition, wherein an electrical signal is generated, the frequency of which is a function of the magnitude of said condition, apparatus including a signal generator of variable frequency, a first frequency-selective circuit coupled to said generator and having first and second output terminals and producing a first alternating voltage, which increases in value as the frequency of said signal increases, a second frequency-selective circuit coupled to said generator and having third and fourth output terminals and producing a second alternating voltage, which decreases in value as the frequency of said signal increases, said first and third terminals being coupled to a common reference point, a network connecting said second and fourth terminals including a first rectifier, a high-resistance potentiometer having a manually adjustable contact and a second rectifier connected in series, said rectifiers being arranged to pass current in a common direction, and a control circuit responsive to a predetermined voltage connected between said network and said reference point.

13. A system in accordance with claim 12 wherein said control circuit responsive to a predetermined voltage comprises a gaseous discharge tube having a cathode-grid control circuit responsive selectively to the polarity of the voltage between said network and said reference point, and means coupling said cathode-grid circuit to said reference point and to said manually adjustable contact so that said gaseous tube is controlled in accordance with the polarity of the voltage existing between said reference point and said adjustable contact.

CARL G. SONTHEIMER.

References Cited in the file of this patent

UNITED STATES PATENTS

| Number | Name | Date |
|---|---|---|
| 1,626,724 | Demarest et al. | May 3, 1927 |
| 1,711,101 | Shanck | Apr. 30, 1929 |
| 1,977,776 | Rea | Oct. 23, 1934 |
| 2,334,704 | Hilferty | Nov. 23, 1943 |
| 2,417,292 | Coake | Mar. 11, 1947 |
| 2,459,261 | Browne | Jan. 18, 1949 |
| 2,519,668 | Konigsberg | Aug. 22, 1950 |
| 2,541,067 | Jaynes | Feb. 13, 1951 |
| 2,584,714 | Kirkpatrick | Feb. 5, 1952 |